United States Patent
Oto

(10) Patent No.: US 11,470,686 B2
(45) Date of Patent: Oct. 11, 2022

(54) COMMUNICATION SYSTEM AND COMMUNICATION METHOD FOR PERFORMING RELAY

(71) Applicant: JVCKENWOOD Corporation, Kanagawa (JP)

(72) Inventor: Teruki Oto, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 77 days.

(21) Appl. No.: 16/937,719

(22) Filed: Jul. 24, 2020

(65) Prior Publication Data
US 2021/0037600 A1   Feb. 4, 2021

(30) Foreign Application Priority Data
Jul. 30, 2019  (JP) .............................. JP2019-140099

(51) Int. Cl.
| | |
|---|---|
| *H04W 88/04* | (2009.01) |
| *H04W 36/30* | (2009.01) |
| *H04B 17/318* | (2015.01) |
| *H04W 36/18* | (2009.01) |
| *H04W 92/12* | (2009.01) |

(52) U.S. Cl.
CPC .......... *H04W 88/04* (2013.01); *H04B 17/318* (2015.01); *H04W 36/18* (2013.01); *H04W 36/30* (2013.01); *H04W 92/12* (2013.01)

(58) Field of Classification Search
CPC ..... H04W 88/04; H04W 36/18; H04W 36/30; H04W 92/12; H04W 36/00837; H04W 36/03; H04B 17/318
See application file for complete search history.

(56) References Cited

U.S. PATENT DOCUMENTS

2018/0041605 A1 *   2/2018   Zhang .................. H04W 76/14

FOREIGN PATENT DOCUMENTS

| EP | 1244321 A1 * | 9/2002 | ............ H04W 60/00 |
|---|---|---|---|
| JP | 2008245228 A | 10/2008 | |

* cited by examiner

*Primary Examiner* — Ankur Jain
(74) *Attorney, Agent, or Firm* — Brundidge & Stanger, P.C.

(57) ABSTRACT

A first wireless device and a second wireless device are connected via a first IF and a second IF. A first controller performs control so as to execute a first mode in which a first communication interface performs communication with a base station device and a second controller does not perform communication between a second communication interface and a terminal device. When the reception strength of a signal from the base station device received in the first communication interface is smaller than a threshold value, the first controller performs control so as to execute a second mode in which the first communication interface performs communication with the base station device and the second controller performs communication between the second communication interface and the terminal device.

8 Claims, 8 Drawing Sheets

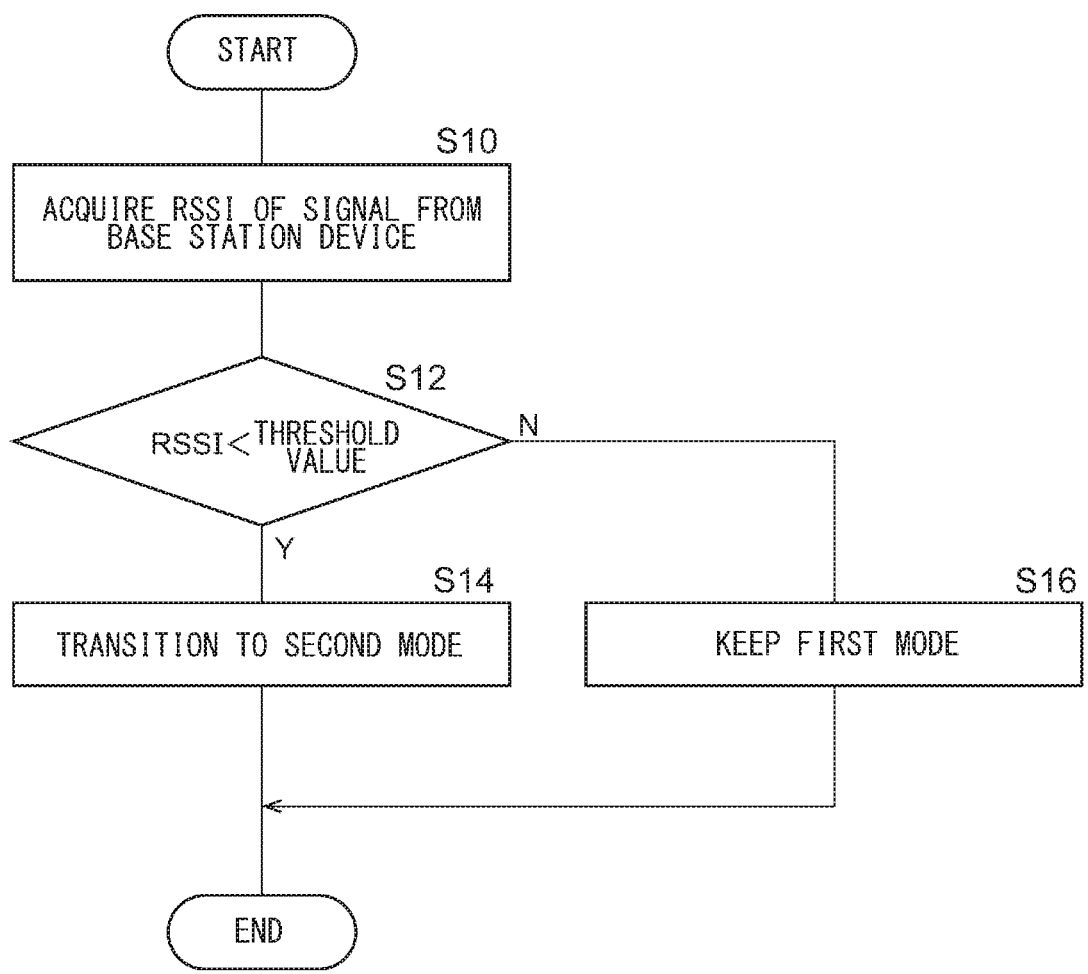

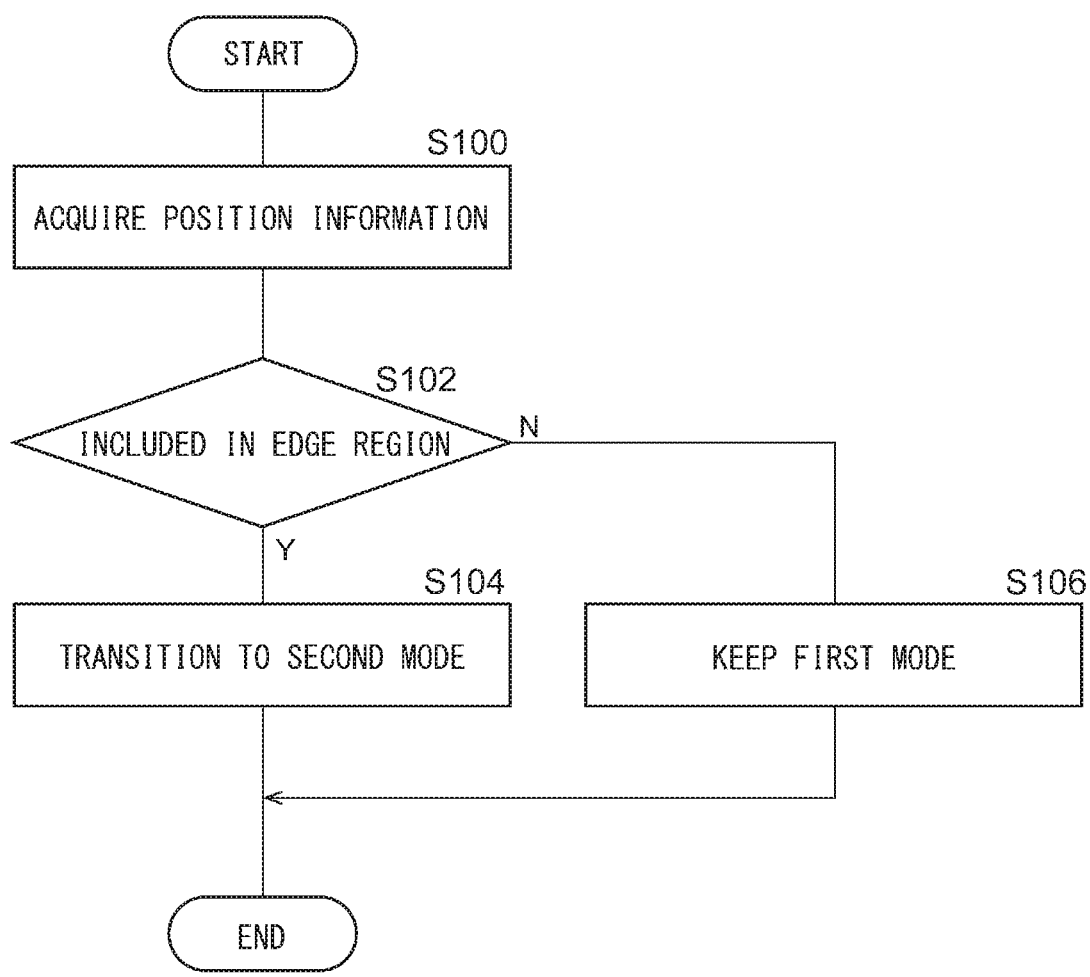

COMMUNICATION SYSTEM AND COMMUNICATION METHOD FOR PERFORMING RELAY

CROSS-REFERENCE TO RELATED APPLICATION

This application is based upon and claims the benefit of priority from the prior Japanese Patent Application No. 2019-140099, filed on Jul. 30, 2019, the entire contents of which is incorporated herein by reference.

BACKGROUND OF THE INVENTION

1. Field

The present invention relates to wireless communication technologies and particularly to a communication system and a communication method that perform relay.

2. Description of the Related Art

A wireless relay system has been proposed that is capable of communicating with mobile stations located outside the communication area of a base station device or in a no-signal zone. For example, when an in-vehicle wireless device that performs communication as a mobile station to which a handset is connected (communication execution mode) is switched to a repeater that performs wireless relay (relay execution mode) and operated, by disconnecting the handset connected to the in-vehicle wireless device from the in-vehicle wireless device, the in-vehicle wireless device operates as a repeater, and the handset operates as a mobile wireless device. The in-vehicle wireless device switched to the repeater relays the radio waves of the mobile wireless device and enables communication with mobile stations located outside the communication area of the base station device or in a no-signal zone (for example, see Patent Document 1).

[Patent Document 1] Japanese Patent Application Publication No. 2008-245228

In order to switch an in-vehicle wireless device between a communication execution mode and a relay execution mode, it is necessary to artificially disconnect a handset connected to the in-vehicle wireless device from the in-vehicle wireless device, that is, to switch manually.

SUMMARY OF THE INVENTION

A communication system according to one aspect of the present embodiment includes: a first wireless device that has a first communication interface, a first interface, and a first controller; and a second wireless device that has a second communication interface, a second interface, and a second controller. The first wireless device and the second wireless device are connected via the first interface and the second interface, the first controller performs control so as to execute a first mode in which the first communication interface performs communication with a base station device and the second controller does not perform communication between the second communication interface and a terminal device, and when the reception strength of a signal from the base station device received in the first communication interface is smaller than a threshold value, the first controller performs control so as to execute a second mode in which the first communication interface performs communication with the base station device and the second controller performs communication between the second communication interface and the terminal device.

Another aspect of the present embodiment also relates to a communication system. This communication system is a communication system that includes: a first wireless device that has a first communication interface, a first interface, and a first controller; a second wireless device that has a second communication interface, a second interface, and a second controller; and an acquirer that acquires position information of the communication system. The first wireless device and the second wireless device are connected via the first interface and the second interface, the first controller performs control so as to execute a first mode in which the first communication interface performs communication with a base station device and the second controller does not perform communication between the second communication interface and a terminal device, and when the position of the communication system indicated by the position information acquired by the acquirer is included in a predetermined region, the first controller performs control so as to execute a second mode in which the first communication interface performs communication with the base station device and the second controller performs communication between the second communication interface and the terminal device.

Yet another aspect of the embodiment relates to a communication method. This method includes: performing control so as to execute a first mode in which a first communication interface performs communication with a base station device and a second controller does not perform communication between a second communication interface and a terminal device; and performing control, when the reception strength of a signal from the base station device received in the first communication interface is smaller than a threshold value, so as to execute a second mode in which the first communication interface performs communication with the base station device and the second controller performs communication between the second communication interface and the terminal device.

Optional combinations of the aforementioned constituting elements and implementations of the present embodiments in the form of methods, apparatuses, systems, recording mediums, and computer programs may also be practiced as additional modes of the present embodiments.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 4 is a flowchart showing a processing procedure by the communication system;

FIG. 8 is a flowchart showing a processing procedure by the communication system according to the third exemplary embodiment.

DETAILED DESCRIPTION OF THE PREFERRED EMBODIMENT

The invention will now be described by reference to the preferred embodiments. This does not intend to limit the scope of the present invention, but to exemplify the invention.

First Exemplary Embodiment

A brief description of the present invention will be given first before a specific description thereof is given. Exemplary embodiments of the present invention relate to a mobile communication system including a base station device, a terminal device, and a communication system. The terminal device can communicate with the base station device when the terminal device is within a communication region formed by the base station device. However, the terminal device cannot communicate with the base station device when the terminal device is outside the communication region. The communication system has a configuration where two wireless devices similar to the terminal device are connected. This communication system executes a mode for communicating with a base station device (hereinafter, referred to as "first mode") just like a terminal device and a mode for relaying between a terminal device and a base station device existing outside a communication region (hereinafter, referred to as "second mode"). That is, the communication system automatically selects between the first mode and the second mode and switches the modes. Considering the convenience of the user, the switching between the first mode and the second mode is preferably performed automatically. The communication system according to the present exemplary embodiment measures the reception strength of a signal received from the base station device, selects the first mode when the reception strength is equal to or higher than a threshold value, and selects the second mode when the reception strength is lower than the threshold value. The threshold value is set to be close to the reception strength at the edge of the communication region. Therefore, the communication system executes the second mode when the communication system exists at the edge of the communication region. Usually, the communication system is used as an in-vehicle wireless device and can transmit a signal with a transmission power that is larger than that of the terminal device. Therefore, for the threshold to be set, the transmission power of the terminal device is taken into consideration, and reception strength higher than the reception strength at the boundary at which a signal transmitted from the communication system reaches the base station device is desirably set to be the threshold value.

Figure 1A:
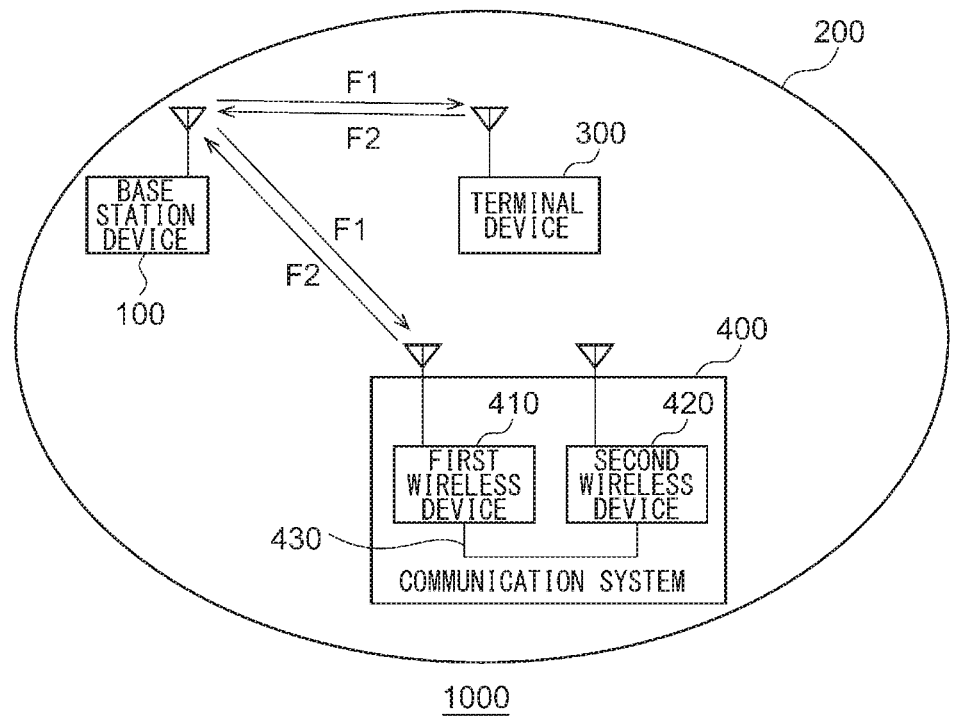
FIGS. 1A and 1B are diagrams showing the configuration of a mobile communication system according to the first exemplary embodiment.
Figure 1B:
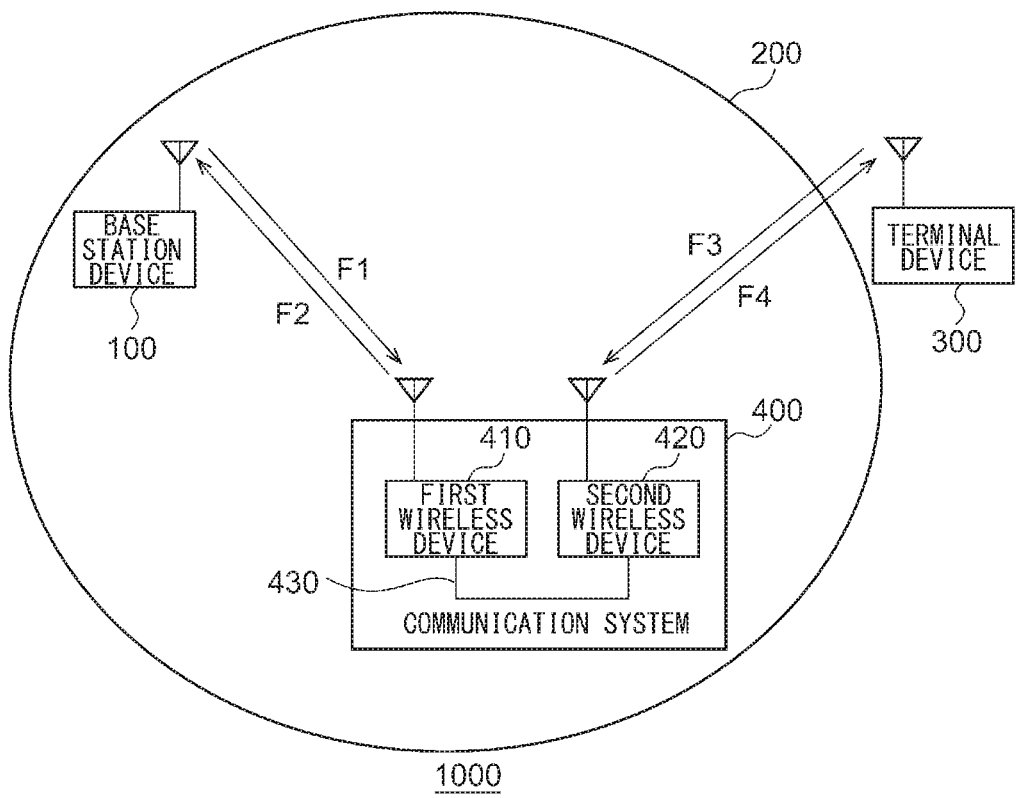

FIGS. 1A to 1B show the configuration of a mobile communication system 1000. The mobile communication system 1000 includes a base station device 100, a terminal device 300, and a communication system 400. The communication system 400 includes a first wireless device 410, a second wireless device 420, and a connecting member 430. The number of base station devices 100, the number of terminal devices 300, and the number of communication systems 400 included in mobile communication system 1000 are not limited to "1". FIG. 1A shows a case where the communication system 400 executes the first mode, and FIG. 1B shows a case where the communication system 400 executes the second mode.

In FIG. 1A, an area in which the base station device 100 can communicate is shown as a communication region 200. The terminal device 300 and the communication system 400 exist inside the communication region 200. Therefore, the terminal device 300 and the communication system 400 can communicate with the base station device 100. The base station device 100 transmits a signal to terminal device 300 at a frequency F1, and the terminal device 300 transmits a signal to the base station device 100 at a frequency F2. The frequency F1 and the frequency F2 are frequencies that are different from each other. Further, the base station device 100 transmits a signal to the communication system 400 at the frequency F1, and the communication system 400 transmits a signal to the base station device 100 at the frequency F2. In such a situation, the communication system 400 performs the same communication as that in the terminal device 300.

The communication system 400 includes a first wireless device 410 and a second wireless device 420 that are independent of each other, and these wireless devices are connected by a connecting member 430. An example of the connecting member 430 is a cable. However, the connecting member 430 is not limited to a cable as long as the connecting member 430 allows for the input and output of a signal between the first wireless device 410 and the second wireless device 420. The first wireless device 410 and the second wireless device 420 have the same communication function as that of the terminal device 300. However, the transmission power of the first wireless device 410 and the transmission power of the second wireless device 420 may be set to be larger than the transmission power of the terminal device 300. In FIG. 1A, only the first wireless device 410 communicates with the base station device 100. However, the second wireless device 420 may communicate with the base station device 100 independently of the first wireless device 410. In that case, it can be considered that the terminal device 300, the first wireless device 410, and the second wireless device 420 are equally connected to the base station device 100.

In FIG. 1B, the terminal device 300 exists outside the communication region 200, and the communication system 400 exists inside the communication region 200. Therefore, the terminal device 300 is not capable of communicating with the base station device 100, and the communication system 400 is capable of communicating with the base station device 100. By operating as a repeater, the communication system 400 relays communication between the base station device 100 and the terminal device 300. The base station device 100 transmits a signal to the first wireless device 410 at the frequency F1, the first wireless device 410 outputs the received signal to the second wireless device 420 via the connecting member 430, and the second wireless device 420 transmits a signal to the terminal device 300 at a frequency F3. Further, the terminal device 300 transmits a signal to the second wireless device 420 at a frequency F4, the second wireless device 420 outputs the received signal to the first wireless device 410 via the connecting member 430, and the first wireless device 410 transmits a signal to the base station device 100 at the frequency F2. The frequency F1, the frequency F2, the frequency F3, and the frequency F4 are frequencies that are different from one another.

Figure 2:
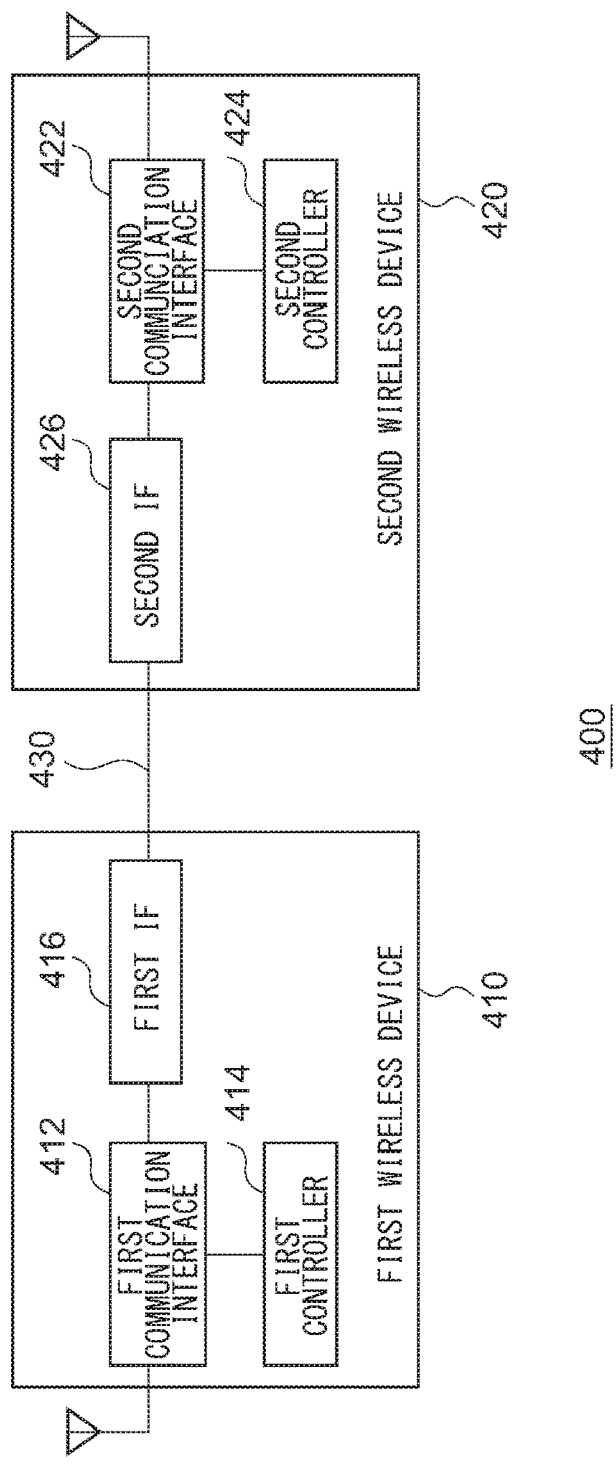
FIG. 2 is a diagram showing the configuration of a communication system.

FIG. 2 shows the configuration of the communication system 400. The communication system 400 includes a first wireless device 410, a second wireless device 420, and a connecting member 430. The first wireless device 410 includes a first communication interface 412, a first controller 414, a first IF 416, and the second wireless device 420 includes a second communication interface 422, a second controller 424, and a second IF 426. The communication system 400 is formed by a combination of two devices: the first wireless device 410; and the second wireless device 420. However, the communication system 400 may be formed as a single device.

The first communication interface 412 communicates with the base station device 100 by performing communication complying with a communication method defined in the mobile communication system 1000, for example, a commercial wireless communication method. The first controller 414 sets the first mode or the second mode as the mode of the communication system 400. In the present exemplary embodiment, the first controller 414 is the main controller that sets the first mode or the second mode. Therefore, the first controller 414 may be simply referred to as a controller. The setting of the first mode or the second mode will be described later. Further, when setting the first mode, the first controller 414 causes the first communication interface 412 to perform the same process as that of the terminal device 300, that is, causes the first communication interface 412 to perform a process for performing communication with the base station device 100. The first IF 416 is an interface for connecting the connecting member 430. The first IF 416 is connected to the first communication interface 412 and is also connected to the second wireless device 420 via the connecting member 430. When the communication system 400 is set to the second mode, the first IF 416 outputs a signal received by the first communication interface 412 to the second wireless device 420 and outputs a signal received from the second wireless device 420 to the first communication interface 412.

The second IF 426 is an interface for connecting the connecting member 430. The second IF 426 is connected to the second communication interface 422 and is also connected to the first wireless device 410 via the connecting member 430. When the communication system 400 is set to the second mode, the second IF 426 outputs a signal received from the first wireless device 410 to the second communication interface 422 and outputs a signal received by the second communication interface 422 to the first wireless device 410. The second communication interface 422 is configured in the same way as in the first communication interface 412. The second communication interface 422 is connected to the first communication interface 412 via the second IF 426, the connecting member 430, and the first IF 416.

The second controller 424 receives information regarding the mode set in the first controller 414 from the first controller 414 via the first communication interface 412, the first IF 416, the connecting member 430, and the second communication interface 422. The second controller 424 sets the second communication interface 422 to the first mode or the second mode according to the setting in the first controller 414. Therefore, it can be considered that the first controller 414 executes the first mode for causing the first communication interface 412 to perform communication with the base station device 100 and the second mode for relaying communication between the base station device 100 and the terminal device 300 by causing the second communication interface 422 to perform communication with the terminal device 300 while causing the first communication interface 412 to perform communication with the base station device 100. Further, when setting the first mode, the second controller 424 may cause the second communication interface 422 to perform the same process as that of the terminal device 300 or stop the operation of the second communication interface 422.

Figure 3A:
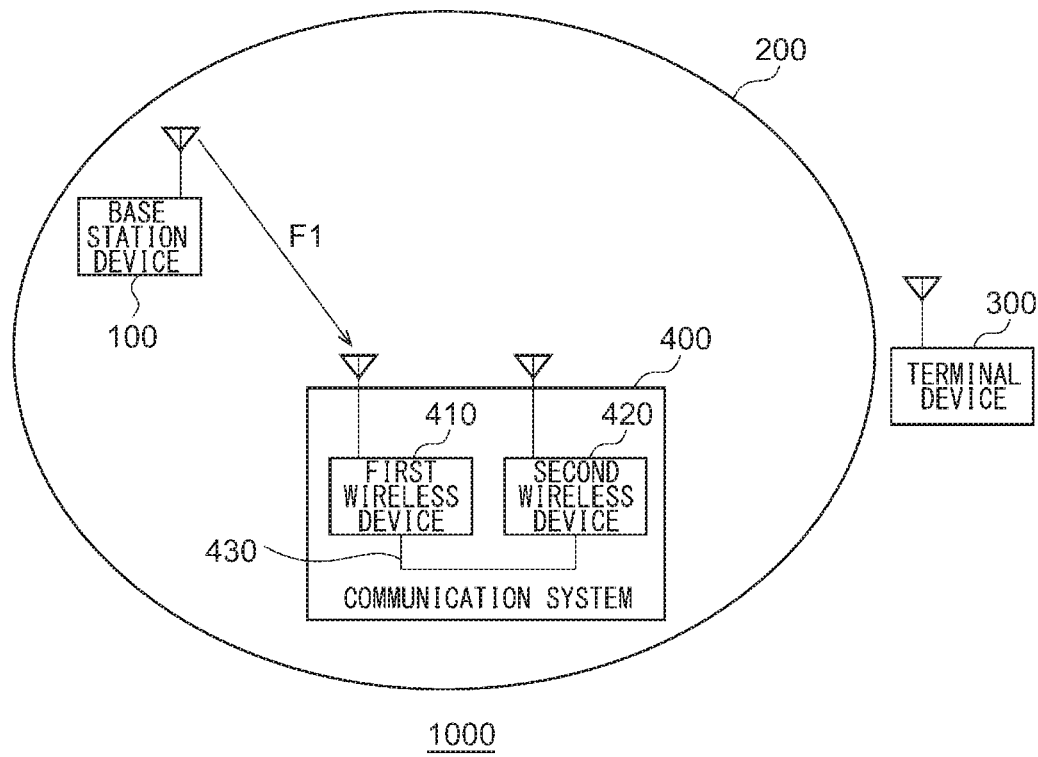
FIGS. 3A and 3B are diagrams showing a general outline of the operation of the communication system in a first mode in the mobile communication system according to the first exemplary embodiment.
Figure 3B:
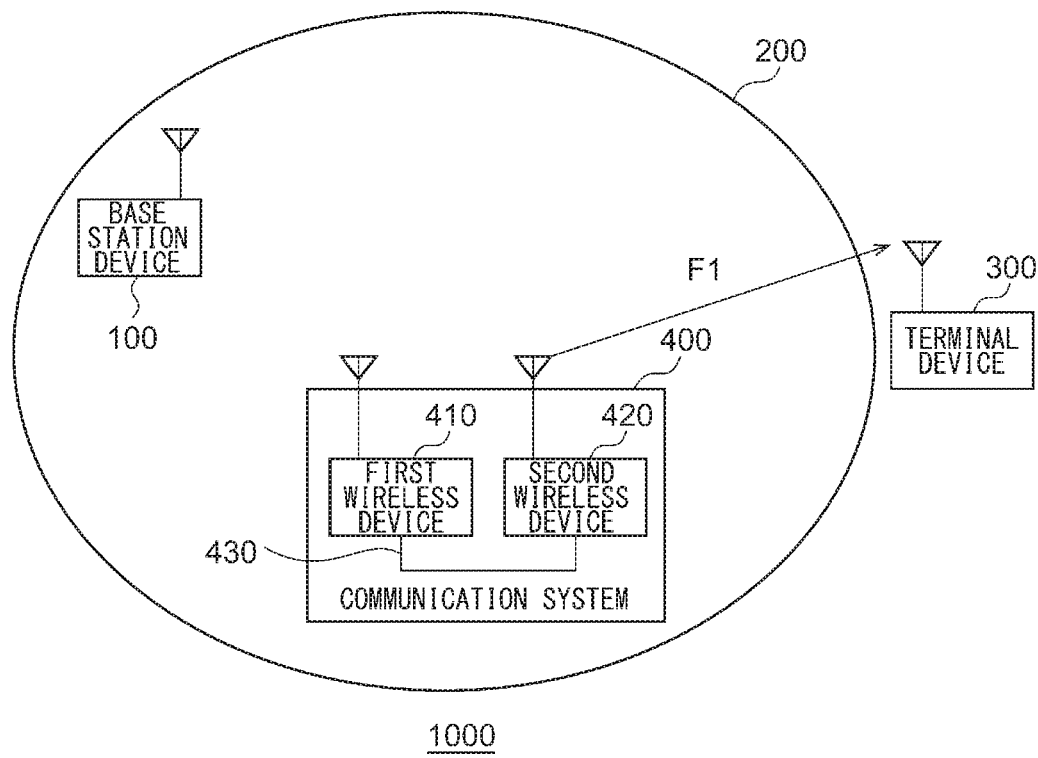

In the following, the operation of the first controller 414 and the operation of the second controller 424 will be described while also using FIGS. 3A-3B. FIGS. 3A-3B show an outline of the operation of the mobile communication system 1000. In FIG. 3A, upon receiving a signal from the base station device 100 at the frequency F1, the first communication interface 412 of the first wireless device 410 measures the reception strength of the signal. An example of the reception strength is received signal strength indicator (RSSI). Since a publicly-known technology may be used for the measurement in the first communication interface 412, the description thereof is thus omitted. However, such measurement is performed regularly. The first communication interface 412 outputs a measured RSSI to the first controller 414. The first controller 414 selects the second mode when the RSSI received from the first communication interface 412 is smaller than a threshold value and selects the first mode when the RSSI received from the first communication interface 412 is greater than or equal to the threshold value. The threshold value is set to be close to the RSSI expected at the edge of the communication region 200. Therefore, the first controller 414 executes the second mode when existing at the edge of the communication region 200, and executes the first mode when existing in the central part of the communication region 200. The first controller 414 sets the selected mode to the first communication interface 412.

Further, the mobile communication system 1000 may operate while using a threshold value used when the first controller 414 switches from the first mode to the second mode as a first threshold value, and using a threshold value used when the first controller 414 switches from the second mode to the first mode as a second threshold value that is larger than the first threshold value. As described above, by making the threshold value for switching from the first mode to the second mode different from the threshold value for switching from the second mode to the first mode, frequent switching of the communication system 400 between the modes can be suppressed.

The first controller 414 outputs information regarding the selected mode to the second controller 424 of the second wireless device 420 via the first communication interface 412, the first IF 416, the connecting member 430, and the second communication interface 422.

When the information regarding the selected mode indicates the change from the first mode to the second mode, the second controller 424 outputs a signal for instructing the transition to the second mode (hereinafter referred to as "transition instruction signal") to the second communication interface 422. The transition instruction signal indicates that the communication system 400 relays communication between the terminal device 300 and the base station device 100 and that the frequency F3 is used for transmission from the second wireless device 420 to the terminal device 300 and the frequency F4 is used for transmission from the terminal device 300 to the second wireless device 420. As shown in FIG. 3B, the second communication interface 422 transmits a transition instruction signal to the terminal device 300 at the frequency F1. Upon receiving the transition instruction signal, the terminal device 300 switches the frequency F1 to the frequency F3 and switches the frequency F2 to the frequency F4. As a result, the communication such as the one shown in FIG. 1B is performed.

When the information regarding the selected mode indicates the change from the second mode to the first mode, the second controller 424 outputs a signal for instructing the transition to the first mode (hereinafter also referred to as "transition instruction signal") to the second communication interface 422. The transition instruction signal indicates that the terminal device 300 and the base station device 100 communicate directly, that the frequency F1 is used for transmission from the base station device 100 to the terminal device 300, and that the frequency F2 is used for the transmission from the terminal device 300 to the base station device 100. The second communication interface 422 transmits a transition instruction signal to the terminal device 300 at the frequency F3. Upon receiving the transition instruction signal, the terminal device 300 switches the frequency F3 to the frequency F1 and switches the frequency F4 to the frequency F2. As a result, the communication such as the one shown in FIG. 1A is performed.

The configuration is implemented in hardware by any CPU of a computer, memory or other LSI's, and in software by a program or the like loaded into the memory. The figure depicts functional blocks implemented by the cooperation of hardware and software. Thus, a person skilled in the art should appreciate that there are many ways of accomplishing these functional blocks in various forms in accordance with the components of hardware only or the combination of hardware and software.

An explanation will be given of the operation of the mobile communication system 1000 having the above-stated structure. FIG. 4 is a flowchart showing a processing procedure by the communication system 400. As a premise, it is assumed that the first controller 414 has selected the first mode. The first controller 414 acquires the RSSI of a signal from the base station device 100 (S10). When the RSSI is smaller than the threshold value (Y in S12), the first controller 414 determines to transition to the second mode (S14). When the RSSI is not smaller than the threshold value (N in S12), the first controller 414 determines to keep the first mode (S16).

According to the present exemplary embodiment, since the mode for performing relay is selected when the reception strength of a signal from the base station device is smaller than the threshold value, the mode for performing communication and the mode for performing relay can be automatically switched from each other. Further, since the mode for performing relay is selected when the reception strength of a signal from the base station device is smaller than the threshold value, relay can be automatically performed at the edge of the communication region.

Second Exemplary Embodiment

Subsequently, the second exemplary embodiment will be described. The second exemplary embodiment relates to a mobile communication system including a base station device, a terminal device, and a communication system in the same way as in the first exemplary embodiment. In the first exemplary embodiment, switching from the first mode to the second mode is determined based on the reception strength of a signal received from the base station device. On the other hand, in the second exemplary embodiment, switching from the first mode to the second mode is determined based on the reception strength of a signal received from the base station device and the reception strength of a signal received from the terminal device. A mobile communication system 1000 and a base station device 100 according to the second exemplary embodiment are of the same types as those in FIGS. 1 and 2. A description will be made mainly regarding the difference from the previous explanations.

Figure 5:
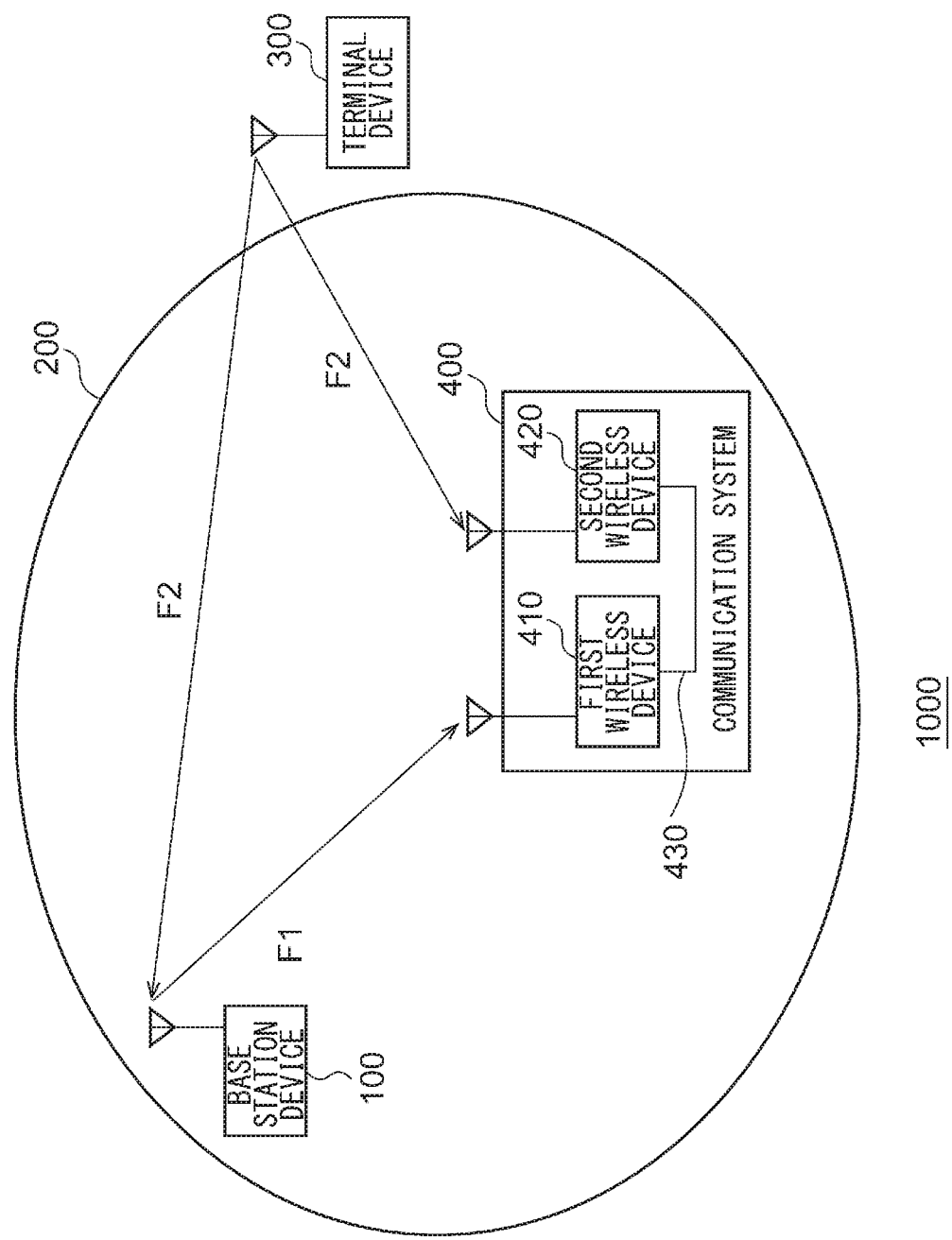
FIG. 5 is a diagram showing a general outline of operation of the communication system in the first mode in a mobile communication system according to the second exemplary embodiment.

FIG. 5 shows an outline of the operation of the mobile communication system 1000. When the communication as shown in FIG. 1A is realized, the base station device 100 transmits a signal to the first wireless device 410 at the frequency F1, and the first wireless device 410 receives the signal. Further, the terminal device 300 transmits a signal to the base station device 100 at the frequency F2, and the base station device 100 receives the signal. At that time, the second wireless device 420 intercepts the signal transmitted from the terminal device 300 to the base station device 100 at the frequency F2. In the first mode, the second controller 424 (FIG. 2) of the second wireless device 420 causes the second communication interface 422 to measure the reception strength of the received signal. An example of the reception strength is RSSI as described above. The second communication interface 422 outputs the measured RSSI to the first controller 414 via the second IF 426, the connecting member 430, the first IF 416, and the first communication interface 412.

In the same way as before, the first controller 414 receives the RSSI measured by the first communication interface 412, that is, the RSSI of a signal from the base station device 100 (hereinafter, this RSSI is referred to as "first RSSI"). Further, the first controller 414 receives the RSSI measured by the second communication interface 422, that is, the RSSI of a signal from the terminal device 300 to the base station device 100 (hereinafter, this RSSI is referred to as "second RSSI"). The first controller 414 selects the second mode when the first RSSI is smaller than the threshold value and the second RSSI is equal to or larger than a specified value. The specified value is set to a value that is larger than the threshold value described above. Therefore, the first controller 414 executes the second mode when the communication system 400 exists at the edge of the communication region 200 and the terminal device 300 exists near the communication system 400. The same applies to the subsequent processes. Thus, the explanation thereof is omitted here.

Figure 6:
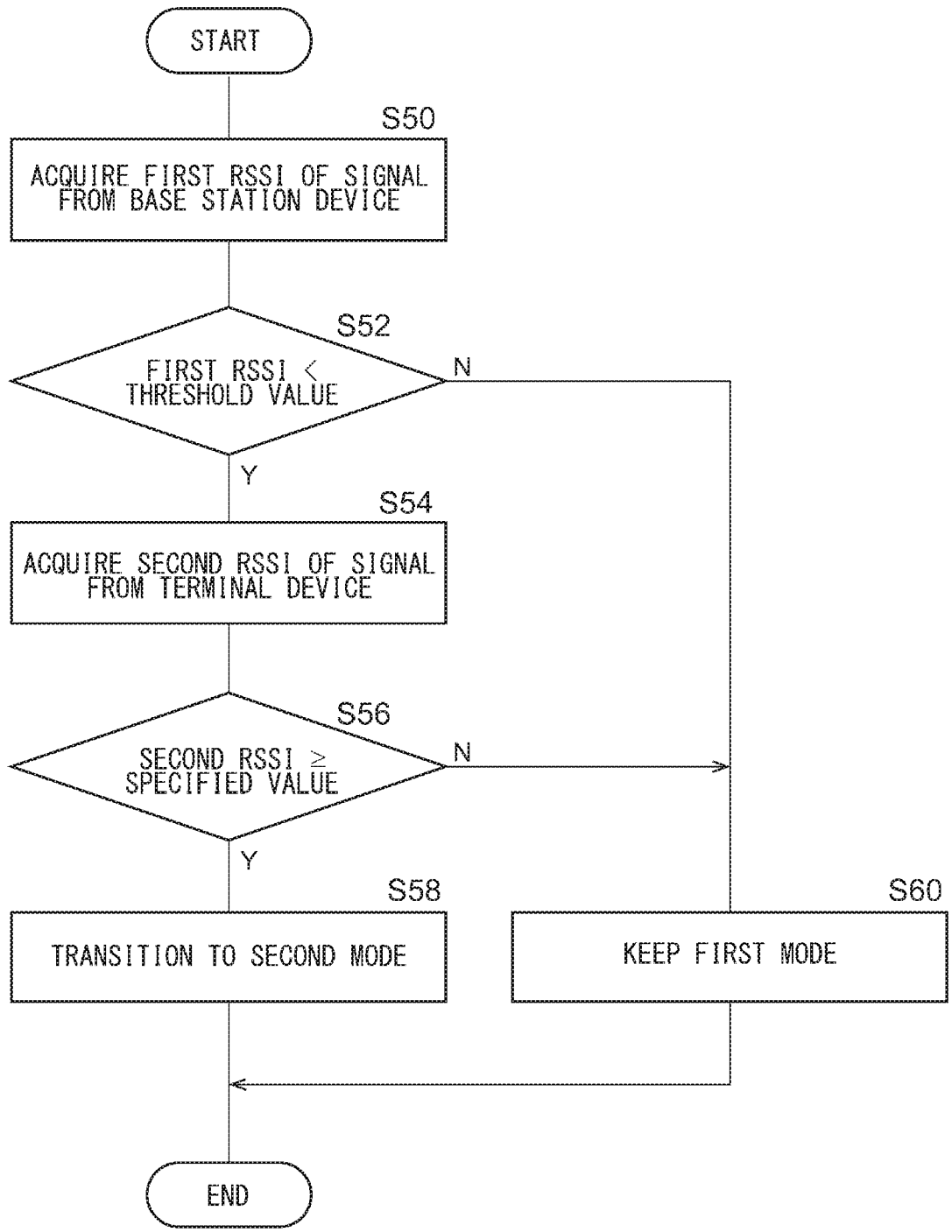
FIG. 6 is a flowchart showing a processing procedure by a communication system according to the second exemplary embodiment.

An explanation will be given of the operation of the mobile communication system 1000 having the above-stated structure. FIG. 6 is a flowchart showing a processing procedure by the communication system 400. As a premise, it is assumed that the first controller 414 has selected the first mode. The first controller 414 acquires the first RSSI of a signal from the base station device 100 (S50). When the first RSSI is smaller than the threshold value (Y in S52), the first controller 414 acquires the second RSSI of a signal from the terminal device 300 (S54). When the second RSSI is equal to or greater than the specified value (Y in S56), the first controller 414 determines to transition to the second mode (S58). When the first RSSI is not smaller than the threshold value (N in S52) or the second RSSI is not equal to or more than the specified value (N in S56), the first controller 414 determines to keep the first mode (S60).

According to the present exemplary embodiment, since the mode for performing relay is selected when the reception strength of a signal from the base station device is smaller than the threshold value and the reception strength of a signal from the terminal device is equal to or more than the specified value, the mode for performing communication and the mode for performing relay can be automatically switched from each other. Further, since the mode for performing relay is selected when the reception strength of a signal from the base station device is smaller than the threshold value and the reception strength of a signal from the terminal device is equal to or more than the specified value, relay can be automatically performed when the terminal device is near the edge of the communication region.

Third Exemplary Embodiment

Subsequently, the third exemplary embodiment will be described. The third exemplary embodiment relates to a mobile communication system including a terminal device and a communication system capable of communicating with a base station device, in the same way as described thus far. Previously, switching from the first mode to the second mode is determined based on the reception strength of a signal that is received. On the other hand, in the third exemplary embodiment, information on a region in which the second mode is to be executed is stored in advance, and when the position according to the position information of the communication system 400 is included in the region, switching from the first mode to the second mode is determined. A mobile communication system 1000 and a base station device 100 according to the third exemplary embodiment are of the same types as those in FIGS. 1 and 2. A description will be made mainly regarding the difference from the previous explanations.

Figure 7:
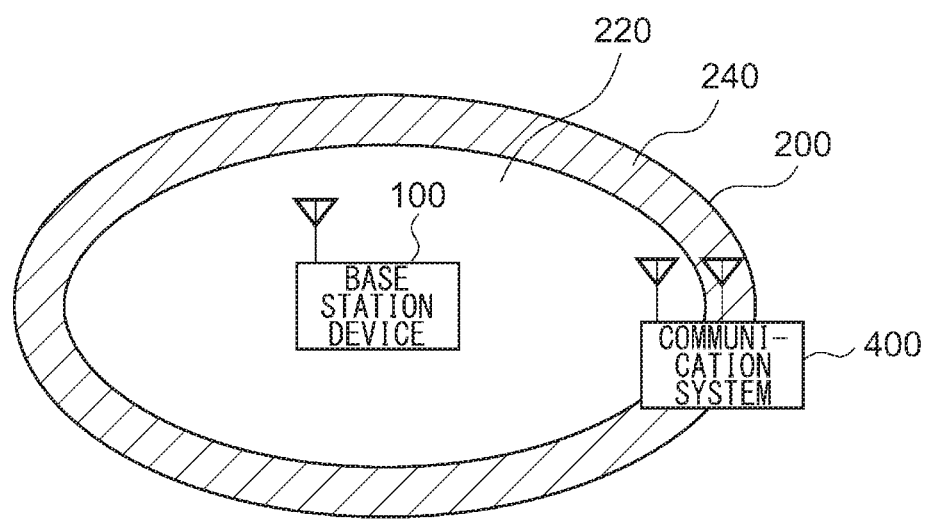
FIG. 7 is a diagram showing a general outline of a process in a communication system according to the third exemplary embodiment.

Upon receiving a signal from the base station device 100 at the frequency F1, the first communication interface 412 in FIG. 2 measures the RSSI as the reception strength of the signal, in the same way as described thus far. The first controller 414 receives the position information of the communication system 400 from an acquirer (not shown) mounted in the communication system 400 when the RSSI is smaller than the threshold value. The acquirer acquires the position information by, for example, the global positioning system (GPS). The first communication interface 412 saves the received position information as the region described above. That is, the first controller 414 sets and saves the above-described region based on the position information of the communication system 400 received from the acquirer under a situation where the RSSI is smaller than the threshold value. FIG. 7 shows an outline of an edge region 240, which is a region where the second mode is to be executed in the communication system 400. The edge region 240 indicates a region saved by the first controller 414. The edge region 240 corresponds to the edge of a communication region 200 in FIG. 7. Further, a part of the communication region 200 other than the edge region 240 is indicated as a central region 220. FIG. 2 is referred back.

The first controller 414 regularly receives the position information from the acquirer. The first controller 414 selects the second mode when the position according to the acquired position information is included in the edge region 240. On the other hand, the first controller 414 selects the first mode when the position according to the acquired position information is included in the central region 220. Further, the first controller 414 selects the first mode when the position according to the acquired position information is outside the edge region 240. That is, the first controller 414 selects the first mode when the position according to the acquired position information is not included in the edge region 240.

Further, a region (not shown) inside the central region 220 and separated from the edge region 240 may be set as a second central region and may be set as a region where the communication system 400 in the second mode is switched to the first mode. That is, the mode may be switched to the second mode when the position according to the position information acquired in the communication system 400 in the first mode is included in the edge region 240, and the mode may be switched to the first mode when the position according to the position information acquired in the communication system 400 in the second mode is included in the second central region.

The same applies to the subsequent processes. Thus, the explanation thereof is omitted here.

An explanation will be given of the operation of the mobile communication system 1000 having the above-stated structure. FIG. 8 is a flowchart showing a processing procedure by the communication system 400. As a premise, it is assumed that the first controller 414 has selected the first mode. The first controller 414 acquires the position information of the communication system 400 (S100). When the position according to the position information is included in the edge region 240 (Y in S102), the first controller 414 determines to transition to the second mode (S104). When the position according to the position information is not included in the edge region 240 (N in S102), the first controller 414 determines to keep the first mode (S106).

According to the present exemplary embodiment, when the reception strength of a signal from the base station device is smaller than a threshold value, acquired position information is set indicate an edge region, and the edge region can thus be generated in advance. Since the mode for performing relay is selected when the position according to the position information is included in the edge region, the mode for performing communication and the mode for performing relay can be automatically switched from each other.

Described above is an explanation based on the exemplary embodiments of the present invention. These exemplary embodiments are intended to be illustrative only, and it will be obvious to those skilled in the art that the same applies when the process of the first wireless device and the process of the second wireless device are switched with each other such that the second controller of the second wireless device controls the first wireless device and that various modifications to constituting elements and processes could be developed and that such modifications are also within the scope of the present invention.

What is claimed is:

1. A communication system comprising:
a first wireless device that has a first communication interface, a first interface, and a first controller; and
a second wireless device that has a second communication interface, a second interface, and a second controller, wherein
the first wireless device and the second wireless device are connected via the first interface and the second interface,
the first communication interface receives a signal transmitted by a base station device and measures a reception strength of the signal,
the first controller selects a first mode or a second mode based on the reception strength measured by the first communication interface and causes the first communication interface to operate according to a selected mode, the first mode and the second mode being modes of operation of the first wireless device and the second wireless device, the second controller acquires a mode selected by the first controller via the first interface and the second interface connected to the second controller and causes the second communication interface to operate according to the mode acquired, the first mode is selected when the reception strength measured by the first communication interface is greater than or equal to a predefined predetermined threshold value and is a mode in which the first communication interface performs communication with the base station device just like a terminal device and the second communication interface does not perform communication, and the second mode is selected when the reception strength measured by the first communication interface is smaller than the predefined predetermined threshold value and is a mode in which the first communication interface and the second communication interface connected via the first interface and the second interface relay a signal of the base station device and the terminal device.

2. The communication system according to claim 1, wherein the transmission power of the first communication interface is larger than the transmission power of the terminal device.

3. The communication system according to claim 1, wherein
the second communication interface intercepts a signal transmitted by the terminal device to the base station device and measures a second reception strength,
the second controller communicates the second reception strength to the first controller via the first interface and the second interface connected to the second controller,
the first controller selects the second mode when the reception strength measured by the first communication interface is smaller than a predefined threshold value and when the second reception strength measured by the second communication interface is equal to or more than a predefined second threshold value.

4. A communication system comprising:
a first wireless device that has a first communication interface, a first interface, and a first controller;
a second wireless device that has a second communication interface, a second interface, and a second controller; and
an acquirer that acquires position information of the communication system, wherein
the first wireless device and the second wireless device are connected via the first interface and the second interface,
the first controller selects a first mode or a second mode based on the position information acquired by the acquirer and causes the first communication interface to operate according to a selected mode, the first mode and the second mode being modes of operation of the first wireless device and the second wireless device,
the second controller acquires a mode selected by the first controller via the first interface and the second interface connected to the second controller and causes the second communication interface to operate according to the mode acquired,
the first mode is selected when the position information acquired by the acquirer is not included in a predefined predetermined region and is a mode in which the first communication interface performs communication with a base station device just like a terminal device and the second communication interface does not perform communication, and the second mode is selected when the position information acquired by the acquirer is included in the predefined predetermined region and is a mode in which the first communication interface and the second communication interface connected via the first interface and the second interface relay a signal of the base station device and the terminal device.

5. The communication system according to claim 4, wherein the transmission power of the first communication interface is larger than the transmission power of the terminal device.

6. The communication system according to claim 4, wherein
the first communication interface receives a signal transmitted by the base station device and measures a reception strength of the signal
the first controller sets the predetermined region based on the position information acquired by the acquirer where the reception strength measured by the first communication interface is smaller than a predefined threshold value.

7. The communication system according to claim 4, wherein
the second communication interface receives a signal transmitted from the terminal device to the base station device and measures a second reception strength,
the second controller communicates the second reception strength to the first controller via the first interface and the second interface connected to the second controller,
the first controller selects the second mode when a position of the communication system indicated by the position information acquired by the acquirer is included in the predetermined region and when the second reception strength measured by the second communication interface is equal to or more than a second predefined threshold value.

8. A communication method comprising:
adapted to a communication system including:
a first wireless device that has a first communication interface, a first interface, and a first controller; and
a second wireless device that has a second communication interface, a second interface, and a second controller, wherein
the first wireless device and the second wireless device are connected via the first interface and the second interface,
the method comprising:
receiving a signal transmitted by a base station device and measuring a reception strength of the signal, using the first communication interface;
selecting, using the first controller, a first mode or a second mode based on the reception strength measured by the first communication interface, the first mode and the second mode being modes of operation of the first wireless device and the second wireless device;
causing, using the first controller, the first communication interface to operate according to a selected mode; and
acquiring a mode selected by the first controller via the first interface and the second interface connected to the second controller and causing the second communication interface to operate according to the mode acquired, using the second controller, wherein the first mode is selected when the reception strength measured by the first communication interface is greater than or equal to a predefined threshold value and is a mode in which the first communication interface performs communication with the base station device just like a terminal device and the second communication interface does not perform communication, and the second mode is selected when the reception strength measured by the first communication interface is smaller than the predefined predetermined threshold value and is a mode in which the first communication interface and the second communication interface connected via the first interface and the second interface relay a signal of the base station device and the terminal device.

* * * * *